United States Patent
Muneto et al.

(10) Patent No.: US 11,717,964 B2
(45) Date of Patent: Aug. 8, 2023

(54) CONTROL DEVICE FOR ROBOT THAT WORKS COLLABORATIVELY WITH PEOPLE

(71) Applicant: KAWASAKI JUKOGYO KABUSHIKI KAISHA, Kobe (JP)

(72) Inventors: Koji Muneto, Kobe (JP); Atsushi Kameyama, Kakogawa (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 50 days.

(21) Appl. No.: 17/045,727

(22) PCT Filed: Apr. 1, 2019

(86) PCT No.: PCT/JP2019/014494
§ 371 (c)(1),
(2) Date: Oct. 6, 2020

(87) PCT Pub. No.: WO2019/194138
PCT Pub. Date: Oct. 10, 2019

(65) Prior Publication Data
US 2021/0362336 A1   Nov. 25, 2021

(30) Foreign Application Priority Data
Apr. 6, 2018 (JP) .................................. 2018-074226

(51) Int. Cl.
*B25J 9/16* (2006.01)
*B25J 13/08* (2006.01)
*B25J 19/06* (2006.01)

(52) U.S. Cl.
CPC .......... *B25J 9/1664* (2013.01); *B25J 9/1651* (2013.01); *B25J 9/1674* (2013.01); *B25J 9/1694* (2013.01);
(Continued)

(58) Field of Classification Search
CPC ...... B25J 9/1664; B25J 9/1651; B25J 9/1674; B25J 13/085; B25J 13/088; B25J 9/043;
(Continued)

(56) References Cited

U.S. PATENT DOCUMENTS 6,208,105 B1 *   3/2001   Kato ...................... B25J 9/1674
                                                                    318/567
10,399,232 B2 *   9/2019   Oestergaard ........... B25J 9/1674
(Continued)

FOREIGN PATENT DOCUMENTS

JP   2017-77608 A    4/2017
JP   2017-202554 A   11/2017
(Continued)

*Primary Examiner* — Abby Y Lin
*Assistant Examiner* — Karston G. Evans
(74) *Attorney, Agent, or Firm* — Oliff PLC

(57) ABSTRACT

A control device for a robot is configured to control operation of a robotic arm having a plurality of links coupled to each other through a rotation axis, and a motor for drive provided to the rotation axis. The control device includes an angle calculating module configured to calculate an angle formed by the two links adjacent to each other through the rotation axis, and an angle monitoring module configured to monitor whether the angle calculated by the angle calculating module is a given angle or below.

6 Claims, 9 Drawing Sheets

(52) U.S. Cl.
    CPC ............ *B25J 9/1682* (2013.01); *B25J 13/085* (2013.01); *B25J 13/088* (2013.01); *B25J 19/06* (2013.01); *G05B 2219/40201* (2013.01); *G05B 2219/40202* (2013.01)

(58) Field of Classification Search
    CPC ........ B25J 9/044; B25J 9/1682; B25J 9/1694; B25J 19/06; G05B 2219/40202; G05B 2219/40201
    See application file for complete search history.

(56) References Cited

U.S. PATENT DOCUMENTS

| | | | |
|---|---|---|---|
| 2004/0164697 A1* | 8/2004 | Iribe | B25J 13/085 318/568.12 |
| 2008/0161970 A1* | 7/2008 | Adachi | B25J 9/1697 901/49 |
| 2010/0236046 A1* | 9/2010 | Lundberg | B23P 21/004 29/430 |
| 2016/0008978 A1* | 1/2016 | Oguri | B25J 9/1612 702/152 |
| 2017/0113349 A1 | 4/2017 | Naitou et al. | |
| 2018/0361578 A1 | 12/2018 | Muneto | |
| 2019/0061155 A1* | 2/2019 | Hashimoto | B25J 9/1666 |
| 2019/0105775 A1* | 4/2019 | Oyama | B25J 9/1676 |

FOREIGN PATENT DOCUMENTS

| | | | | |
|---|---|---|---|---|
| JP | 2017-205819 A | 11/2017 | | |
| WO | WO-2016103308 A1 * | 6/2016 | ............. | B25J 19/06 |
| WO | 2017/094240 A1 | 6/2017 | | |

* cited by examiner

CONTROL DEVICE FOR ROBOT THAT WORKS COLLABORATIVELY WITH PEOPLE

TECHNICAL FIELD

The present disclosure relates to a control device for a robot which coexists and works with people.

BACKGROUND ART

In recent years, it is proposed that a robot and an operator work jointly in the same workspace in terms of an improvement of productivity. Therefore, for the safety perspective, such a robot is provided with a function to detect an external force, and if the external force detected when a human contacts the robot exceeds a given threshold, the robot is stopped to ensure the human's safety. For example, Patent Document 1 discloses a monitoring device for a robot which sets a given area within an operation range of the robot, and differentiates a determination condition of an external force based on whether the external force is from inside the area or outside the area.

REFERENCE DOCUMENT OF CONVENTIONAL ART

Patent Document

[Patent Document 1] JP2017-077608A

DESCRIPTION OF THE DISCLOSURE

Problem to be Solved by the Disclosure

However, generally, actual effects of the robot given to the human around the robot differ greatly according to the position and the posture of a robotic arm. Thus, the conventional monitoring device for the robot may not be optimal for the robot which works collaboratively with people.

Therefore, one purpose of the present disclosure is to provide a control device suitable for a robot which works collaboratively with people.

SUMMARY OF THE DISCLOSURE

According to one aspect of the present disclosure, a control device for a robot configured to control operation of a robotic arm having a plurality of links coupled to each other through a rotation axis, and a motor for drive provided to the rotation axis, is provided. The control device includes an angle calculating module configured to calculate an angle formed by the two links adjacent to each other through the rotation axis, and an angle monitoring module configured to monitor whether the angle calculated by the angle calculating module is a given angle or below.

According to this configuration, it can be monitored whether the angle (joint angle) formed by the two adjacent links of the robotic arm is an angle with possibility of catching an obstacle (e.g., an operator) around the robot between the two links (e.g., an angle range below 20°), and therefore, the control device suitable for the robot which works collaboratively with people can be provided.

Further, the control device for the robot may control the operation of the robotic arm so that a motor speed does not exceed a given speed when the angle calculated by the angle calculating module is the given angle or below.

When the robot and the operator work jointly in the same workspace, workability of the robot improves if the operation of the robot is made faster, but ensuring operator's safety may become a problem. On the other hand, if the operation of the robot is made slower, the workability falls though the operator's safety can be ensured. Thus, the workability of the robot and the operator's safety are in a trade-off relation. According to this configuration, at the joint angle with no possibility of catching the obstacle around the robot (that is, if the angle formed by the two adjacent links of the robotic arm is larger than the given angle), the robotic arm can be operated as fast as possible. On the other hand, at or below the joint angle (e.g., 20°) with possibility of catching the obstacle around the robot, the operation of the robotic arm can be controlled so that the motor speed does not exceed the given speed. Thus, for example, even when a part of the operator near the robot is caught between the adjacent links, the link(s) will not collide at high speed. Therefore, both the robot's workability and the operator's safety can be achieved.

Furthermore, the control device may further include a speed monitoring module configured to monitor whether the motor speed exceeds the given speed when the angle calculated by the angle calculating module is the given angle or below. The operation of the robotic arm may be stopped when the motor speed exceeds the given speed.

According to this configuration, if the joint angle is at or below the angle with possibility of catching the obstacle around the robot, the operation of the robotic arm is stopped when the motor speed exceeds the given speed. Thus, the operator's safety further improves.

Note that the robotic arm may further have a position sensor configured to detect a rotational angle position of the motor for drive. The angle calculating module may calculate the angle formed by the two links adjacent to each other through the rotation axis, based on a detection signal of the position sensor.

The control device may further include an external force detecting module configured to detect an external force acting on the robot, and a force monitoring module configured to detect a collision by using a given monitoring criterion based on the external force detected by the external force detecting module, when the angle calculated by the angle calculating module is the given angle or below. The operation of the robotic arm may be stopped when the collision is detected.

According to this configuration, the collision is detected if the joint angle is at or below the angle with possibility of catching the obstacle around the robot, and after the detection of collision, the operation of the robot can be stopped. The operator's safety further improves.

The control device may further include an external force detecting module configured to detect an external force acting on the robot, and a force monitoring module configured to detect a collision by using a first monitoring criterion based on the external force detected by the external force detecting module, when the angle calculated by the angle calculating module is larger than the given angle, and detect a collision by using a second monitoring criterion that is a monitoring criterion different from the first monitoring criterion based on the external force detected by the external force detecting module, when the angle calculated by the angle calculating module is the given angle or below. The operation of the robotic arm may be stopped when the collision is detected.

According to this configuration, at the angle with no possibility of catching the peripheral object, the collision is detected by using the first monitoring criterion (e.g., setting the collision sensibility lower). On the other hand, at or below the angle with the possibility of catching the peripheral object, the collision is detected by using the second monitoring criterion (e.g., setting the collision sensibility higher). That is, since the collision sensibility can be changed according to the joint angle, both the robot's workability and the operator's safety can be achieved.

Note that, the robotic arm may have one or more rotary joints, and the rotation axis may be a rotation axis of the rotary joint.

Effect of the Disclosure

According to the present disclosure, a control device suitable for a robot which works collaboratively with people can be provided.

MODES FOR CARRYING OUT THE DISCLOSURE

Figure 1:
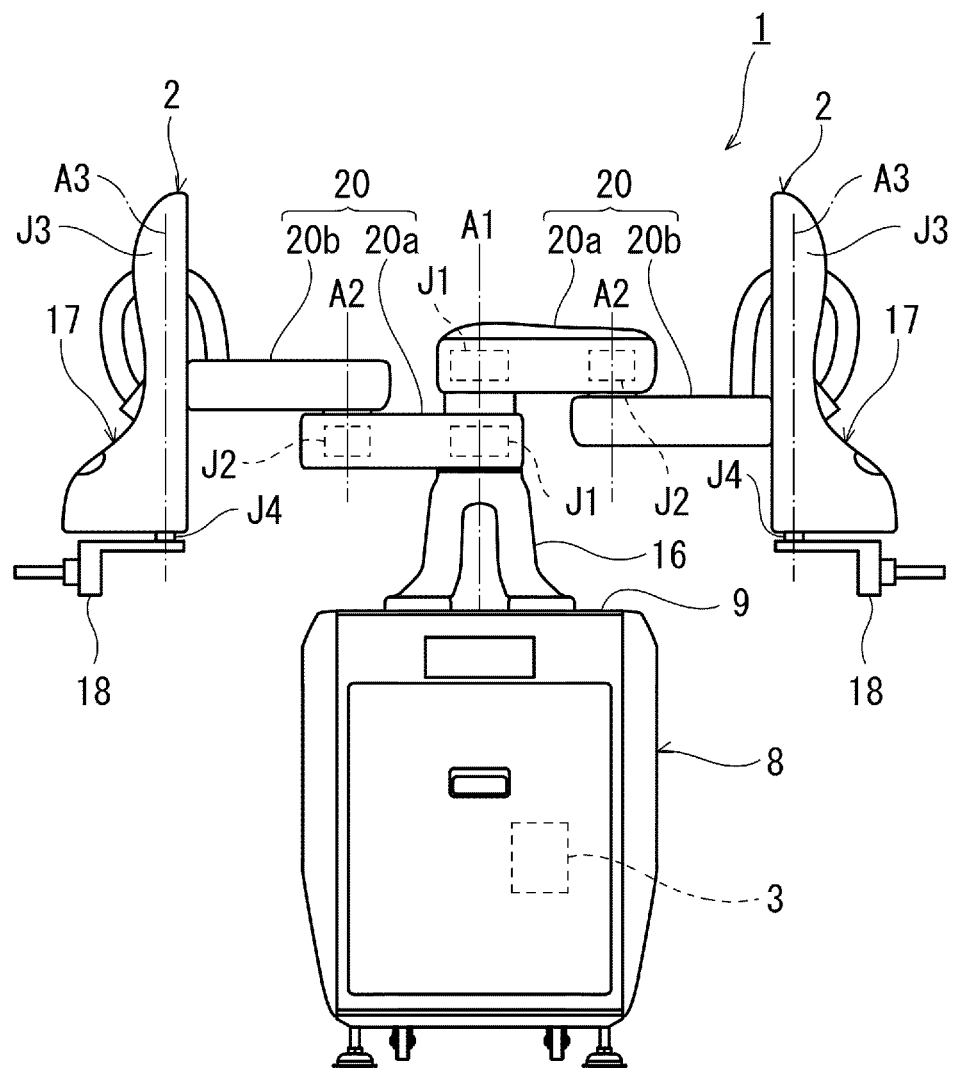
FIG. 1 is a front view schematically illustrating a structure of a robot according to a first embodiment.
Figure 1:
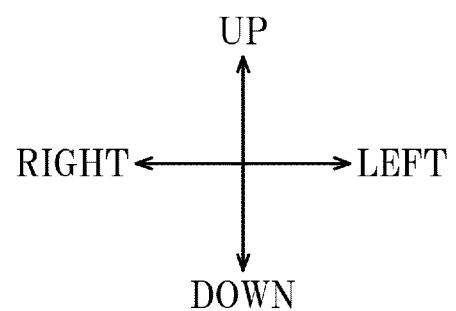

Embodiments of the disclosure are described with reference to the drawings. Below, throughout the drawings, the same reference characters are assigned to the same or corresponding elements to omit redundant description.

First Embodiment

FIG. 1 is a front view schematically illustrating a structure of a robot 1 according to a first embodiment. As illustrated in FIG. 1, the robot 1 includes a base 9 fixed to a carriage 8, a pair of robotic arms (hereinafter, may simply be referred to as "the arm(s)") 2 supported by the base 9, and a control device 3 accommodated inside the base 9. The robot 1 of this embodiment is a coaxial dual-arm horizontal articulated robot. Below, a direction in which the pair of arms 2 are extended is referred to as a left- and right direction, a direction parallel to the axial center of a base shaft 16 is referred to as an up-and-down direction or a vertical direction, and a direction perpendicular to the left-and-right direction and the up-and-down direction is referred to as a front-and-rear direction. Each arm 2 includes an arm part 20, a wrist part 17, and an end effector (not illustrated). Note that the two arms 2 may have substantially the same structure.

Moreover, the two arms 2 can operate independently or dependently. For example, the robot 1 of this embodiment is introduced into a production line and works jointly in the same workspace as an operator.

In this example, the arm part 20 is comprised of a first link 20a and a second link 20b. The first link 20a is coupled through a rotary joint J1 to the base shaft 16 fixed to an upper surface of the base 9 so that it is rotatable about a rotation axis A1 passing through the axial center of the base shaft 16. Moreover, the rotation axes A1 of the first links 20a of the two arms 2 are located on the same straight line, and the first link 20a of one arm 2 and the first link 20a of the other arm 2 are provided with a height difference therebetween. The second link 20b is coupled to a tip end of the first link 20a through a rotary joint J2 so that it is rotatable about a rotation axis A2 defined at the tip end of the first link 20a.

The wrist part 17 has a prismatic joint J3 and a rotary joint J4. The wrist part 17 is ascendible and descendible with respect to the second link 20b by the prismatic joint J3. The wrist part 17 is rotatable about a vertical rotation axis A3 with respect to the second link 20b by the rotary joint J4. A mechanical interface 18 is attached to a tip end of the wrist part 17. The mechanical interface 18 is coupled to a tip end of the second link 20b through the prismatic joint J3 and the rotary joint J4. An end effector (not illustrated) for work is attached to the mechanical interface 18.

Each arm 2 of the above structure has the joints J1-J4. Each of the joints J1-J4 is driven, for example, by a servo mechanism (not illustrated). The servo mechanism includes an actuator for driving and displacing the arm 2, and a transmission mechanism for transmitting power (motive force) of the actuator to the arm 2. In this embodiment, the actuator is realized by, for example, a servomotor, and each servomotor is provided with a position sensor, such as an encoder, which detects a rotational angle position of the motor (not illustrated). Here, the rotational angle position is an angular position of each joint in a joint coordinate system of each servomotor (hereinafter, also referred to as the "joint angle position"). The control device 3 carries out a position control of each servomotor to control the operations of the left and right arms 2 at arbitrary rates.

Figure 2:
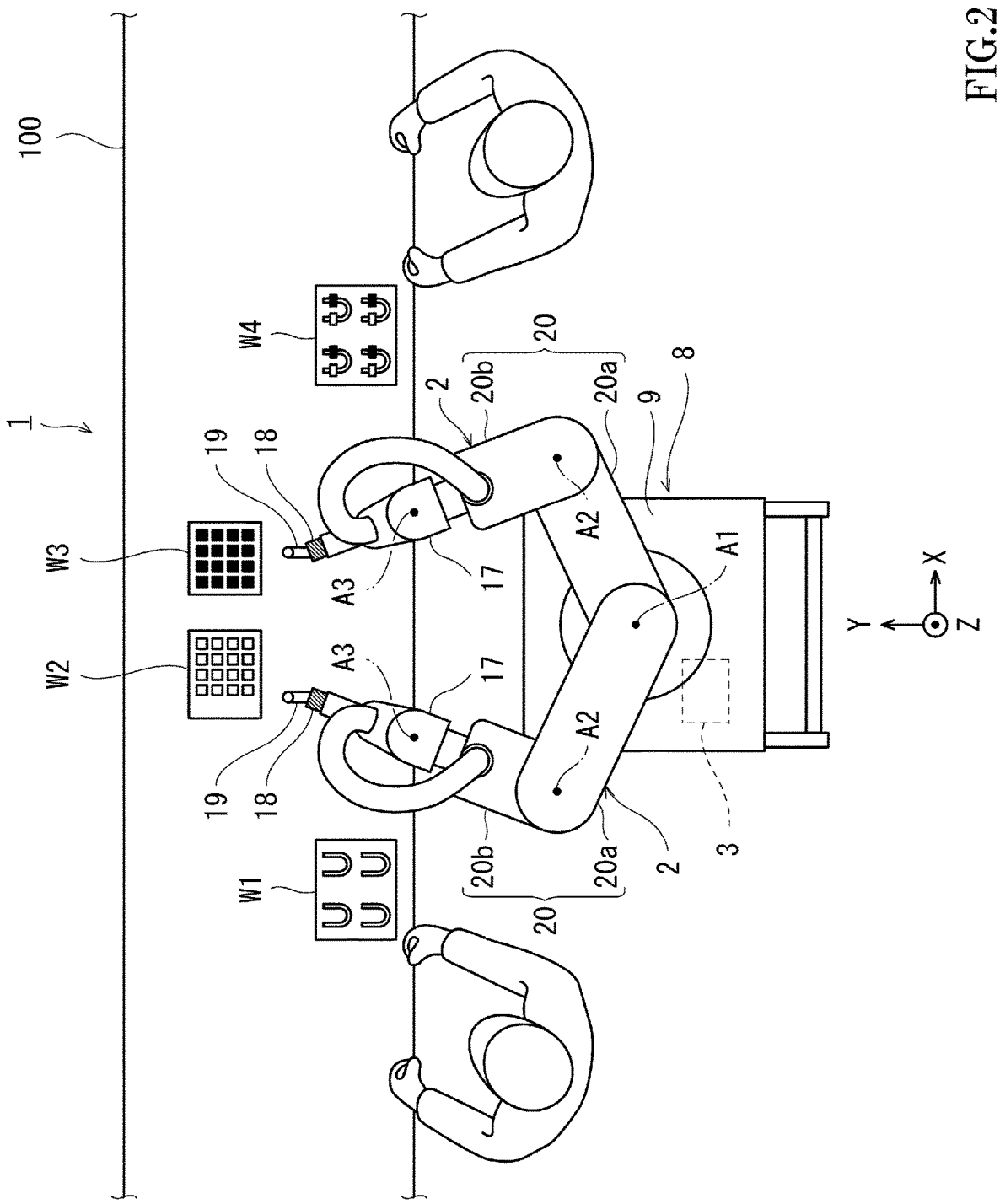
FIG. 2 is a plan view illustrating one example of operation of the robot in FIG. 1.

FIG. 2 is a plan view illustrating one example of operation of the robot 1 in FIG. 1. This robot 1 can be installed in a limited space (e.g., 610 mm×620 mm) equivalent to one person. As illustrated in FIG. 2, the robot 1 is introduced into the production line, and works jointly with the operator at the same production line. On a workbench 100, for example, four kinds of workpieces W1, W2, W3, and W4 are placed. A workspace is given to the robot 1 so that the robot 1 performs operation on the workbench 100 similarly to the operator. An end effector 19 for work is coupled at a tip end (mechanical interface 18) of each of the left and right arms 2 of the robot 1. In this embodiment, the left and right end effectors 19 gave the same structure. Each area on both left and right sides of the workspace of the robot on the workbench 100 is a workspace where the operator performs their operations. For example, the operator located on left side supplies a workpiece W1 which is a material member to the robot 1. The robot 1 attaches a workpiece W2 which is a first component and a workpiece W3 which is a second component to the supplied workpiece W1 to finish a workpiece W4. The operator located on the right side performs the next work process to the finished workpiece W4.

The robot 1 has a reference coordinate system (hereinafter, referred to as the "base coordinate system"). For example, in this coordinate system, an intersection of the installation surface of the base (pedestal) 9 and the rotation axis A1 of the first joint J1 is an origin, the rotation axis of the first joint J1 is Z-axis, an arbitrary axis perpendicular to the Z-axis is X-axis, and an axis perpendicular to the Z-axis and the X-axis is Y-axis. A movable range of the arms 2 of the robot 1 is a circular area (not illustrated) centering on the first joint J1. The operation range of each arm 2 is set on the basis of the base coordinate system. In this embodiment, the operation range is set so as to cover at least the workbench 100 disposed in front of the robot 1. In such a case, depending on the position and the posture of the arm 2, for example, an angle formed by the first link 20a and the second link 20b of the arm part 20 may become sharp. Thus, the operators who work on both sides of the robot 1 may be caught between the first link 20a and the second link 20b which are coupled to each other through the rotation axis A2 of the rotary joint J2 of the arm 2.

Figure 3:
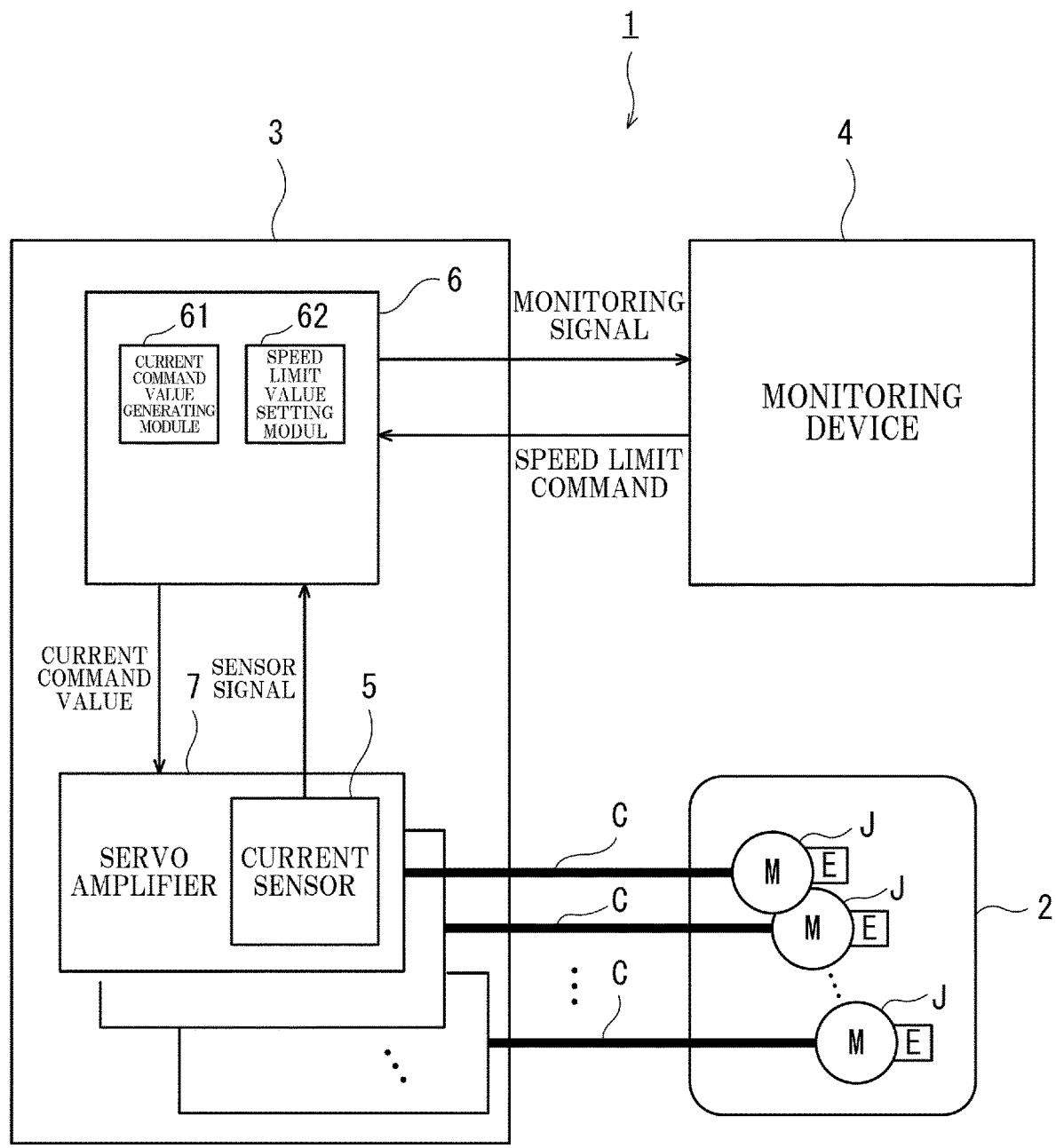
FIG. 3 is a block diagram illustrating the entire configuration of the robot in FIG. 1.

Therefore, the control device 3 of the robot 1 of this embodiment is provided with a monitoring function for monitoring the operation of the robot 1 in order to ensure the safety of the operators around the robot 1. FIG. 3 is a block diagram illustrating the entire configuration of the robot 1. As illustrated in FIG. 3, the robot 1 includes the robotic arms 2, the control device 3, and a monitoring device 4. The robotic arm 2 includes one or more joints J, a plurality of links coupled to each other through the joints, and driving servomotors M provided to the respective joints J. A position sensor E and a current sensor 5 are attached to each servomotor M. The position sensor E, such as an encoder, detects the position of the motor (a rotational angle position of a rotor with respect to a reference rotational angle position), and the current sensor 5 detects current for driving the motor.

The control device 3 is connected with the robotic arms 2 through cables C (illustrated by thick lines). Here, each cable C includes a power line for supplying power to the servomotor M, a brake (not illustrated), etc. of the joint J, and a signal line for receiving a sensor signal from the position sensor E attached to the servomotor M. Moreover, the control device 3 is connected with the monitoring device 4 through a communication cable (not illustrated). Here, for example, the cable C is a serial communication cable, such as RS422. In this embodiment, the control device 3 supplies a monitoring signal (a detection signal of the position sensor) to the monitoring device 4 and receives a speed limit command from the monitoring device 4 through the cable C, and changes the operating speed of the robot 1 according to the speed limit command. Here, the operating speed of the robot 1 is a rotating speed of the servomotor M (hereinafter, referred to as the "motor speed") which constitutes the robotic arm 2.

The control device 3 is a robot controller provided with a processor 6, a servo amplifier 7, a memory, an input/output interface, and a communication interface. The processor 6 includes a current command value generating module 61 and a speed limit value setting module 62. Here, each part (61 and 62) is a functional block implemented by the processor 6 executing a given program. Based on the operation program of the robot, the current command value generating module 61 generates a position command value of the servomotor M for driving the joint J, and generates a speed command value based on a difference between the generated position command value and a detection value (actual value) from the position sensor. Then, it generates a torque command value (current command value) based on a difference between the generated speed command value and the present speed value, and outputs the torque command value to the servo amplifier 7. The servo amplifier 7 is provided corresponding to the servomotor M, generates current based on the given current command value, and supplies the generated current to the servomotor M through the cable C. That is, each servo amplifier 7 is an amplifier which generates the driving current of the servomotor M according to the current command value. The control device 3 controls the operation of each robotic arm 2 by carrying out the position control of the servomotor M provided to each joint J based on the position command value.

The speed limit value setting module 62 sets a speed limit value based on the speed limit command received from the monitoring device 4 so that the motor speed does not exceed a given speed. In this embodiment, the speed limit value setting module 62 sets a speed limit value to a first speed (e.g., 800 mm/s) as an initial value. The current command value generating module 61 gives constraint to the generated speed command value so that the motor speed does not exceed the speed limit value set by the speed limit value setting module 62.

Figure 4:
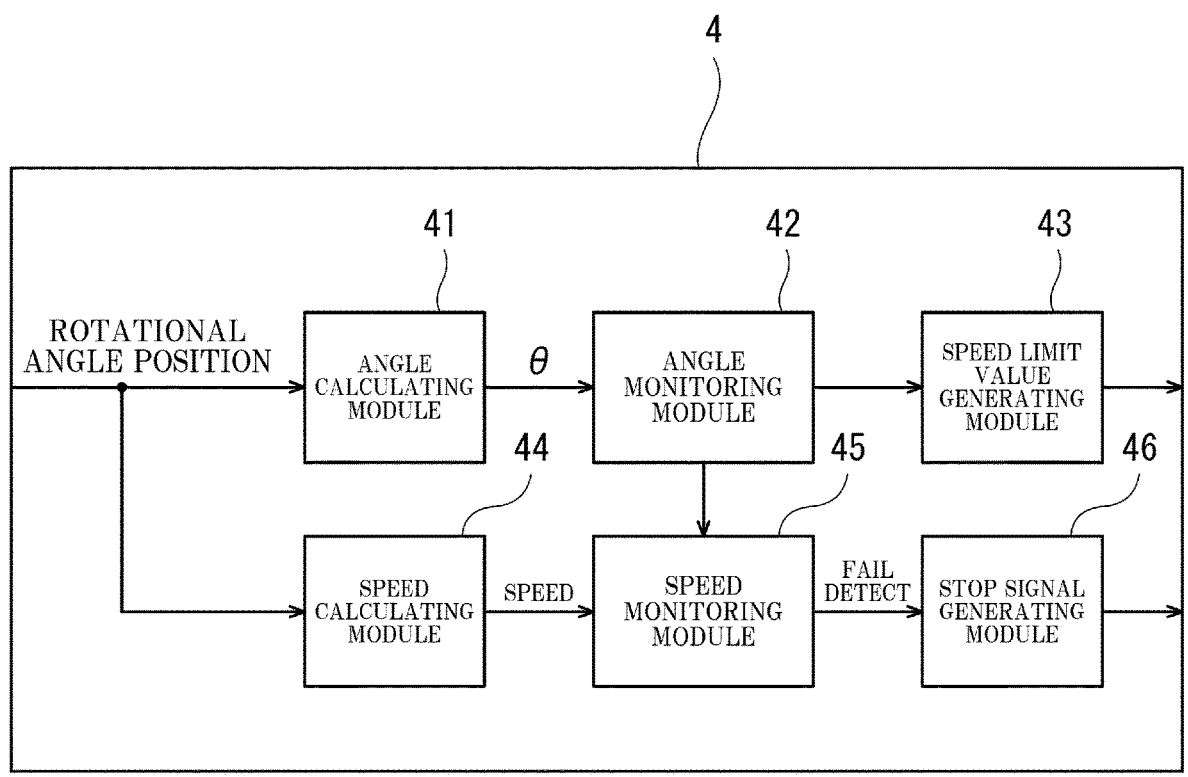
FIG. 4 is a block diagram illustrating a configuration of a monitoring device in FIG. 3.

FIG. 4 is a block diagram illustrating a configuration of the monitoring device 4 in FIG. 3. As illustrated in FIG. 4, the monitoring device 4 includes an angle calculating module 41, an angle monitoring module 42, a speed limit value generating module 43, a speed calculating module 44, a speed monitoring module 45, and a stop signal generating module 46. Here, the monitoring device 4 is a computer provided with one or more processors, a memory, an input/output interface, and a communication interface. Each part (41-46) is a functional block implemented by the processor(s) executing given program(s).

The angle calculating module 41 calculates an angle θ formed by two links which are adjacent to each other through the joint J (hereinafter, referred to as the "joint angle"). In this embodiment, the angle calculating module 41 calculates the joint angle θ based on the rotational angle position (the detection signal of the position sensor E) of the servomotor M provided to a given joint.

The angle monitoring module 42 monitors whether the joint angle θ calculated by the angle calculating module 41 is a given angle or below. In this embodiment, the given angle is 20°. Note that the monitoring device 4 is provided with a user interface (not illustrated) which is adjustable of a setting value of the given angle of the joint which is a monitoring target or the joint angle, for example, to an arbitrary value by an administrator. The angle monitoring module 42 may generate a three-dimensional (3D) model of the robot 1 based on information, such as the rotational angle position of each servomotor, and a preset length and shape of each link.

If the joint angle θ is the given angle or below, the speed limit value generating module 43 generates the speed limit command so that the motor speed does not exceed the given speed, and transmits it to the control device 3. In this embodiment, if the joint angle θ is the given angle or below, the speed limit value generating module 43 generates the speed limit command so that the motor speed does not exceed a second speed which is lower than the first speed (initial value), and transmits it to the control device 3.

The speed calculating module 44 calculates a speed of each servomotor M (motor speed) based on the rotational angle position (the detection signal of the position sensor E) of each servomotor M. Here, the rotational angle position of each servomotor M contained in the monitoring signal is transmitted to the monitoring device 4 from the control device 3 through the communication cable, and is inputted into the speed calculating module 44. The speed calculating module 44 outputs the calculation result to the speed monitoring module 45.

The speed monitoring module 45 monitors whether the motor speed exceeds the given speed. In this embodiment, the speed monitoring module 45 monitors whether the speed of any motor of the servomotors M provided to the joints J1-J4 of each robotic arm 2 exceeds the second speed, when the joint angle θ calculated by the angle calculating module 41 is the given angle or below.

When the joint angle θ is the given angle or below and if the speed monitoring module 45 determines that the motor speed exceeds the second speed, the stop signal generating module 46 generates a stop signal of the robot 1 and supplies it to the control device 3.

The monitoring device 4 of this embodiment is provided with the speed monitoring function, in addition to the joint angle monitoring function.

Figure 5:
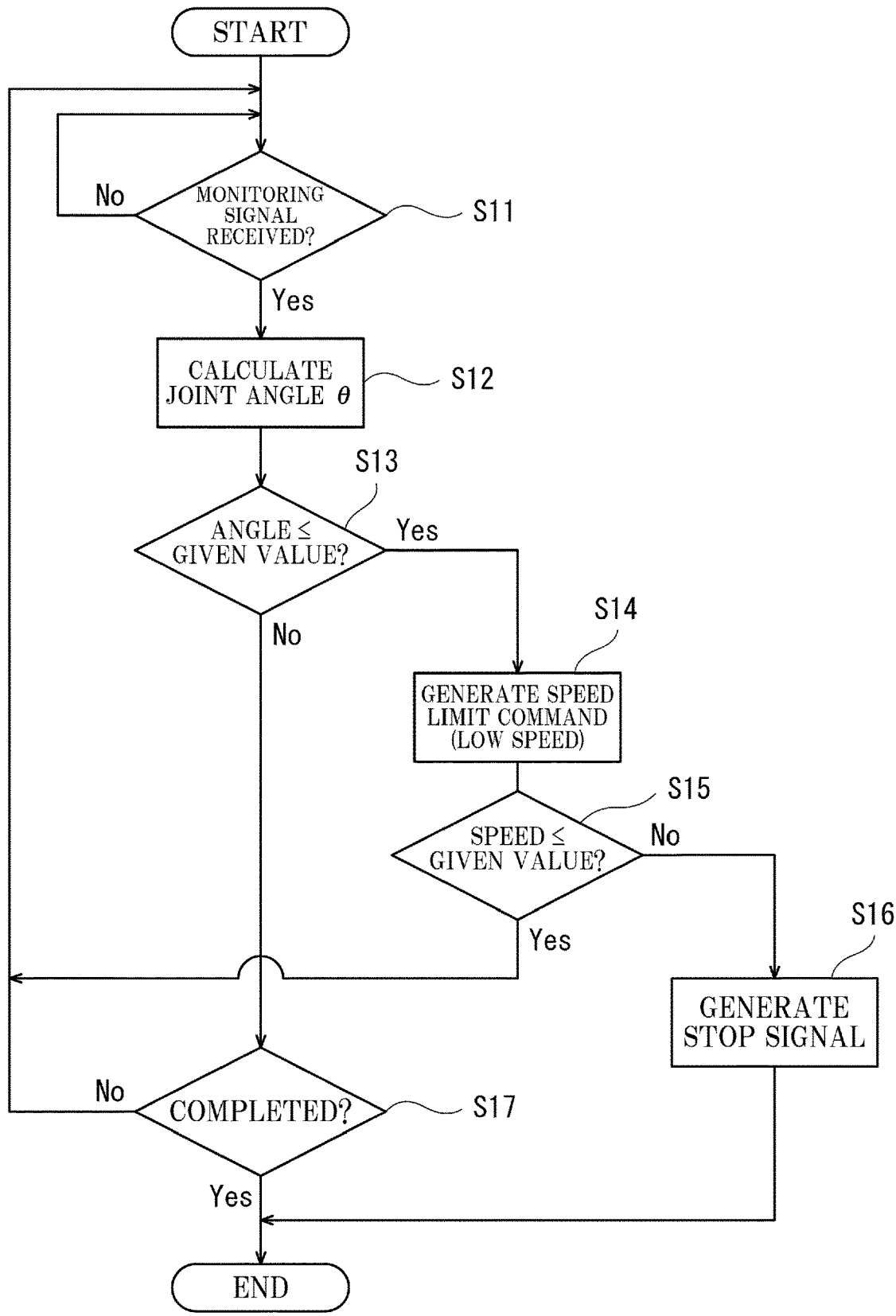
FIG. 5 is a flowchart illustrating one example of a monitoring operation of the robot.

Next, the monitoring operation of the robot 1 by the monitoring device 4 is described with reference to a flowchart of FIG. 5. As illustrated in FIG. 5, the monitoring device 4 first waits for a receipt of the monitoring signal transmitted from the control device 3 at every given interval (Step S11 of FIG. 5). In this embodiment, the monitoring signal includes a detection signal of the position sensor E, which detects the joint angle position, used in the position control of the robotic arm 2 and provided to each joint J.

Figure 6:
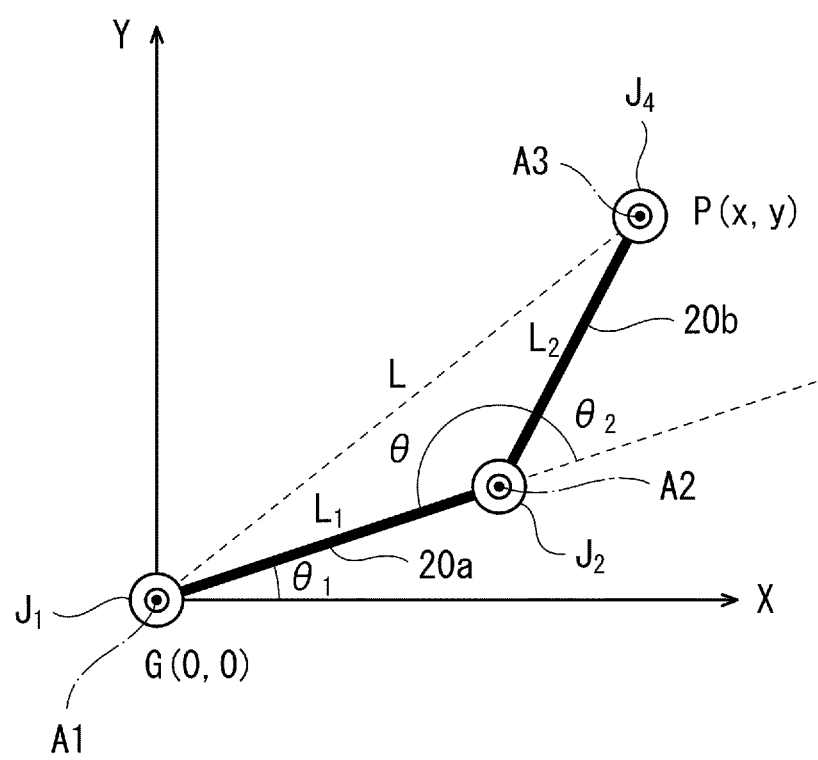
FIG. 6 is a view schematically illustrating joint angles of the robot which is a monitoring target.

Next, the monitoring device 4 calculates the joint angle θ by the angle calculating module 41, when the monitoring signal is received (Step S12 of FIG. 5). FIG. 6 is a view schematically illustrating the joint angle θ of the robot 1 which is the monitoring target. As illustrated in FIG. 6, the joint angle θ to be monitored is a joint angle formed by longitudinal axes of the first link 20a and the second link 20b which are adjacent to each other through the rotation axis A2 of the joint J2. Here, the first to fourth joints J1-J4 in the XY plane defined by the base coordinate system are illustrated. Note that, since the center position coordinates of the prismatic joint J3 and the rotary joint J4 in the XY plane are the same, only the rotary joint J4 is illustrated in this drawing. L1 and L2 are longitudinal lengths of the first link 20a and the second link 20b, respectively. These information are stored beforehand in the memory of the monitoring device 4. θ1 and θ2 are rotational angle positions of the first joint J1 and of the second joint J2, respectively. These information are included in the monitoring signal. Therefore, the angle calculating module 41 can calculate the joint angle θ formed by the first link 20a and the second link 20b which are adjacent to each other through the joint J2, by using the following Formula (1), based on the detection signal of the position sensor E equivalent to the rotational angle position (θ2) of the second joint J2.

$$\theta = 180° - \theta 2 \quad (1)$$

Next, the angle monitoring module 42 monitors whether the joint angle θ calculated by the angle calculating module 41 is the given angle (20°) or below (Step S13 of FIG. 5). The given angle is a given angle at which an obstacle (e.g., an operator) around the first link 20a and the second link 20b may be caught between the first link 20a and the second link 20b. In this embodiment, although the given angle is 20°, it may be suitably set according to the situation around the robot 1 and/or the size of the expected obstacle. If the joint angle θ is within a range larger than 20° and equal to or less than 180° (20°<θ≤180°), the angle monitoring module 42 determines that the obstacle which exists around the robot 1 will not be caught between the first link 20a and the second link 20b. On the other hand, if the joint angle θ is within a range of 20° or smaller and 0° or larger (0°<θ≤20°), the angle monitoring module 42 determines that the obstacle which exists around the robot 1 may be caught between the first link 20a and the second link 20b.

Next, if the joint angle θ calculated by the angle calculating module 41 is 20° or smaller (YES at Step S13 of FIG. 5), the speed limit value generating module 43 generates the speed limit command so that the motor speed does not exceed the second speed which is lower than the first speed, and supplies it to the control device 3 (Step S14 of FIG. 5). Here, the second speed is 250 mm/s which is defined in ISO10218-1 as a low-speed control. Therefore, the control device 3 controls the operation of the robotic arm 2 so that the motor speed does not exceed the second speed. For example, even when a part of the operator near the robot is caught between the adjacent links, the link(s) will not collide with the operator at high speed.

Next, if the joint angle θ calculated by the angle calculating module 41 is 20° or smaller, the speed monitoring module 45 monitors whether the motor speed exceeds the second speed (Step S15 of FIG. 5). In this embodiment, when the joint angle θ is 20° or smaller, the speed monitoring module 45 monitors whether the speed of any motor of the servomotors M provided to the joints J1-J4 of each robotic arm 2 exceeds the first speed.

Next, if the joint angle θ is 20° or smaller (YES at Step S15 of FIG. 5), and when the speed monitoring module 45 determines that the motor speed exceeds the second speed, the stop signal generating module 46 generates the stop signal of the robot 1, and supplies it to the control device 3 (Step S16 of FIG. 5). The control device 3 stops the operation of the robot 1.

On the other hand, if the joint angle θ exceeds 20° (NO at Step S13 of FIG. 5), the speed limit value generating module 43 does not generate the speed limit command. After determining NO at Step S13 of FIG. 5, if it is determined that the work of the robot 1 is finished, i.e., completed (YES at Step S17 of FIG. 5), the monitoring operation of the robot 1 by the monitoring device 4 is ended. On the other hand, after determining NO at Step S13 of FIG. 5, if it is determined that the work of the robot 1 is not finished, i.e., not completed (NO at Step S17 of FIG. 5), the flow returns to Step S11 of FIG. 5, and the monitoring device 4 repeats the same processing. Here, since the initial value of the speed limit value is set as the first speed (e.g., 800 mm/s), the control device 3 controls the operation of the robotic arm 2 at high speed so that the motor speed does not exceed the first speed. Therefore, the robot 1 can demonstrate the maximum capability. The control device 3 repeats such an operation until the robot 1 finishes the work.

Generally, as illustrated in FIG. 2, when the robot 1 and the operator work jointly in the same workspace, the workability improves if the operation of the robot 1 is made faster, but ensuring the operator's safety may become a problem. On the other hand, if the operation of the robot 1 is made slower, the workability falls though the operator's safety can be ensured. Thus, the workability of the robot 1 and the operator's safety are in a trade-off relation. Therefore, according to this embodiment, if the joint angle θ of the robotic arm 2 is larger than 20° (NO at Step S13 of FIG. 5), it is determined that there is no possibility of catching the obstacle (e.g., the operator) around the robot, and the robotic arm 2 is operated as fast as possible (the first speed). On the other hand, if the joint angle θ is 20° or smaller, it is determined that there is possibility of catching the obstacle (e.g., the operator) around the robot, and operates the robotic arm 2 at low speed (the second speed). Thus, for example, even when a part of the operator near the robot is caught between the adjacent links, the link(s) will not collide with the obstacle at high speed. Therefore, both the robot's workability and the operator's safety can be achieved.

Further, in this embodiment, if the joint angle θ is 20° or smaller, since the operation of the robotic arm 2 is stopped when the operating speed of the robotic arm 2 exceeds the second speed, the operator's safety further improves. The control device 3 suitable for the robot which works jointly with people can be provided.

Note that, in this embodiment, although the angle calculating module 41 calculates the joint angle θ based on the detection signal of the position sensor E equivalent to the rotational angle position (θ2) of the second joint J2, it is not limited to this configuration. The angle calculating module 41 may calculate the joint angle θ based on a relative distance L of positions at tip ends of the first link 20a and the second link 20b on the opposite side of the joint J2. As illustrated in FIG. 6, the relative distance L is a distance between the origin G (0, 0) of the base coordinate system which is the center position coordinates of the first joint J1 and position coordinates (x, y) of the center P of the fourth joint J4. For example, by using a known three-dimensional (3D) camera, the relative distance L can be calculated by measuring a distance between two points in a three-dimensional space.

Therefore, since lengths of three sides of a triangle which has the joints J1, J2, and J4 as vertexes are determined, the joint angle θ can be calculated using the cosine theorem of the following Formula (2).

$$\cos θ = (L1^2 + L2^2 - L^2) / 2 \times L1 \times L2 \quad (2)$$

Second Embodiment

Next, a second embodiment is described. Below, description of configurations common to the first embodiment is omitted, and only different configurations are described.

Figure 7:
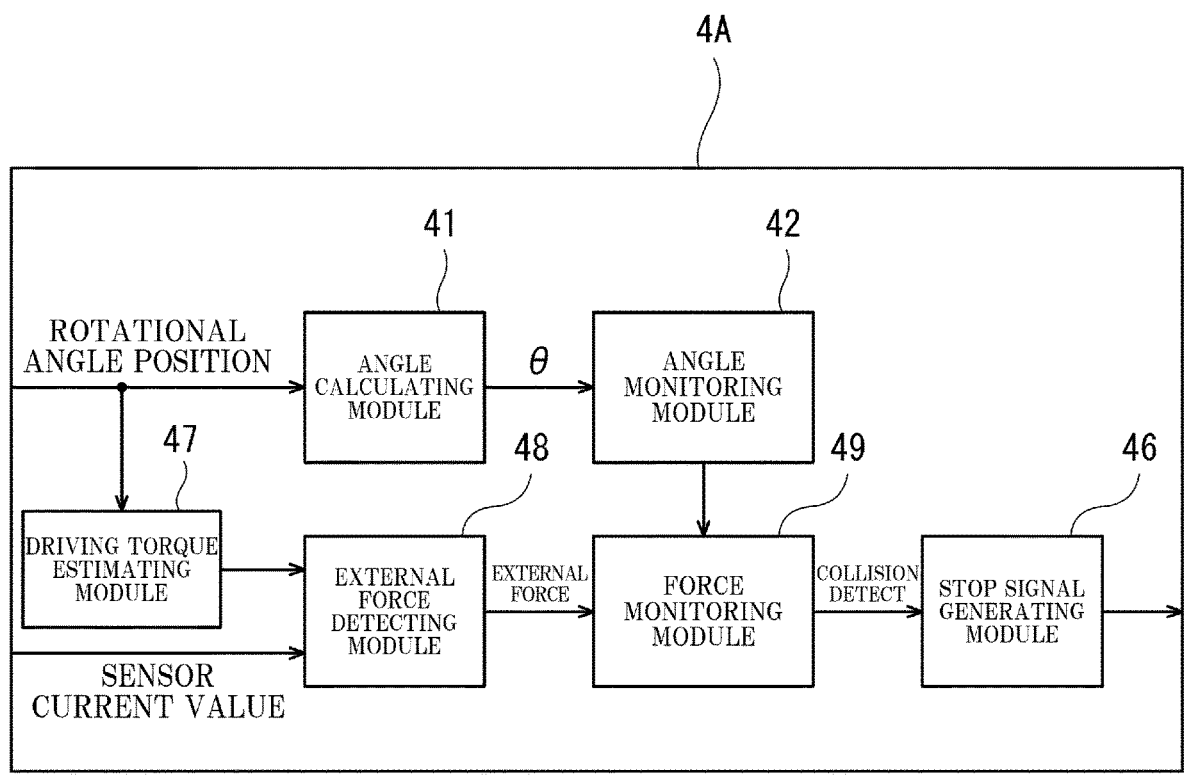
FIG. 7 is a block diagram illustrating a configuration of a monitoring device according to a second embodiment.

FIG. 7 is a block diagram illustrating a configuration of a monitoring device according to the second embodiment. As illustrated in FIG. 7, as compared with the first embodiment (FIG. 4), this embodiment differs in that a monitoring device 4A includes a driving torque estimating module 47, an external force detecting module 48, and a force monitoring module 49, instead of the speed limit value generating module 43, the speed calculating module 44, and the speed monitoring module 45. The monitoring device 4A of this embodiment is provided with a force monitoring function in addition to the joint angle monitoring function. Thus, in this embodiment, the monitoring signal transmitted to the monitoring device 4 from the control device 3 includes the detection signal of the position sensor E and the sensor current value detected by the current sensor 5.

The driving torque estimating module 47 estimates a driving torque required for driving the servomotor of the joint of the robot 1 based on the joint angle position calculated by the position sensor E. In this embodiment, the driving torque estimating module 47 calculates a gravity torque, an inertia force torque, and a frictional force torque, and calculates an estimated value of the driving torque by adding these torques. The gravity torque is a torque for overcoming the weight of each link and maintaining the posture. The inertia force torque is a torque required for overcoming inertia of the link. The frictional force torque is a torque required for overcoming friction of a speed reduction mechanism. Note that, although in this embodiment the driving torque estimating module 47 is mounted on the monitoring device 4, it may be mounted on the control device 3. The driving torque estimated value may be transmitted to the monitoring device 4 from the control device 3 as a monitoring signal, along with a sensor signal including the sensor current value detected by the current sensor 5 and the joint-axis angle position detected by the position sensor E.

The external force detecting module 48 detects an external force which acts on the robot 1. In this embodiment, the external force detecting module 48 converts a value of sensor current, which flows through each servomotor M and is detected by the current sensor 5, into a torque value. Then, it subtracts the estimated value of the driving torque inputted from the driving torque estimating module 47 from the torque value converted from the sensor current value to calculate it as a disturbance torque. Then, it calculates the external force which acts on the robot 1 by using the disturbance torque value, and outputs it to the force monitoring module 49. In detail, the external force detecting module 48 calculates an external force $f_d$ which acts on the tip end of the robot 1 (e.g., a tool center point) based on the disturbance torque $τ_d$, by using the following Formula (3) based on the principle of virtual work.

$$f_d = (K^T)^{-1} τ_d \quad (3)$$

Here, K is a Jacobian matrix and is a matrix expressing a minute displacement relation between the base coordinate system and the joint coordinate system of the robot 1. Regarding the Jacobian matrix K, a relation of Formula (4) is established between an error Δx and a joint angle difference Δθ.

$$Δx = K Δθ \quad (4)$$

Thus, like Formula (3), the external force detecting module 48 calculates the external force $f_d$ which acts on the robot 1 by multiplying the disturbance torque $τ_d$ by an inverse matrix of a transposed matrix $J^T$ of the Jacobian matrix K, and outputs it to the force monitoring module 49. Note that the external force $f_d$ in Formula (3) is an external force when it is assumed to act on the tip end of the robot 1. When the external force $f_d$ acts on a part other than the tip end of the robot 1, the external force $f_d$ may be converted into an external force at an actual acting point.

If the joint angle θ calculated by the angle calculating module 41 is larger than the given angle, the force monitoring module 49 detects a collision by using a first monitoring criterion based on the external force detected by the external force detecting module 48. In detail, the force monitoring module 49 calculates a value $f'_d$ proportional to a derivative of the external force value $f_d$ inputted from the external force detecting module 48, as an impact which acts on the robot 1. The force monitoring module 49 then determines whether a value $|f'_d|$ of the impact which acts on the robot 1 exceeds a first preset threshold $f_{th1}$, and if the value exceeds the first threshold $f_{th1}$, it determines that the robot 1 collided, generates a collision detection signal, and outputs it to the stop signal generating module 46. The impact value $|f'_d|$ to be compared with the first threshold $f_{th1}$ is a scalar value of the external force $f'_d$. Note that the force monitoring module 49 may determine whether the external force value $|f_d|$ inputted from the external force detecting module 48 exceeds a preset threshold to detect a collision. Note that the monitoring device 4 is provided with a user interface (not illustrated) which is adjustable of the threshold for the collision detection, for example, to an arbitrary value by an administrator.

When the collision detection signal is inputted from the force monitoring module 49, the stop signal generating module 46 generates a stop signal of the robot 1 and outputs it to the control device 3.

Next, a monitoring operation of the robot 1 by the monitoring device 4A is described with reference to a flowchart of FIG. 8. Since operations of the angle calculating module 41 and the angle monitoring module 42 from Step S21 to Step S23 in FIG. 8 are the same as the operations from Step S11 to Step S13 in FIG. 5, description thereof is omitted.

Figure 8:
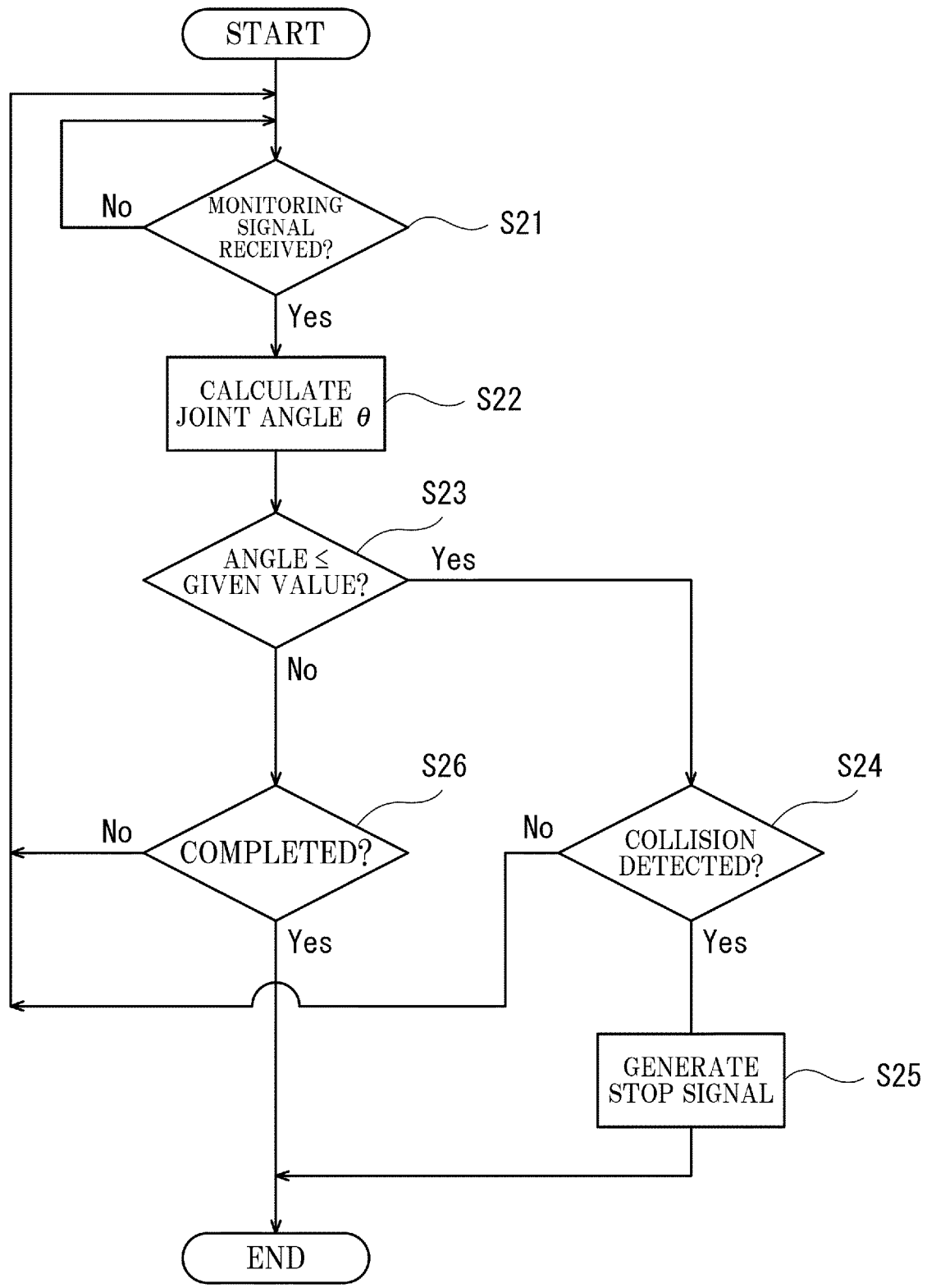
FIG. 8 is a flowchart illustrating one example of a monitoring operation of the robot.

As illustrated in FIG. 8, if the joint angle θ is a given angle or below (YES at Step S23 in FIG. 8), the force monitoring module 49 detects a collision by using the first monitoring criterion based on the external force detected by the external force detecting module 48 (Step S24 in FIG. 8). In detail, the force monitoring module 49 determines whether the external force value $|f_d|$ inputted from the external force detecting module 48 exceeds a first preset threshold $f_{th1}$, and if exceeding the first threshold $f_{th1}$, it determines that the robot 1 collided, generates the collision detection signal, and outputs it to the stop signal generating module 46. Thus, the force monitoring module 49 detects the collision when the angle monitoring module 42 determines that the obstacle (e.g., the operator) which exists around the robot 1 may be caught between the first link 20a and the second link 20b. After determining NO at Step S23 of FIG. 8, if it is determined that the work of the robot 1 is finished, i.e., completed (YES at Step S26 of FIG. 8), the monitoring operation of the robot 1 by the monitoring device 4A is ended. On the other hand, after determining NO at Step S23 of FIG. 8, if it is determined that the work of the robot 1 is not finished, i.e., not completed (NO at Step S26 of FIG. 8), the flow returns to Step S21 of FIG. 8, and the monitoring device 4A repeats the same processing.

Then, if the collision detection signal is inputted from the force monitoring module 49, the stop signal generating module 46 generates the stop signal of the robot 1 (Step S25 of FIG. 8), and outputs it to the control device 3. Therefore, the control device 3 can stop the operation of the robot 1.

According to this embodiment, since the collision is detected at the angle with the possibility of catching the peripheral object, and after the collision is detected, the operation of the robot can be stopped, and the operator's safety can be improved. Therefore, the control device 3 suitable for the robot which works jointly with people can be provided.

Modification

Next, a modification of the force monitoring function of this embodiment is described. In this modification, the collision is detected by using two different monitoring criteria according to the joint angle. In detail, when the joint angle θ calculated by the angle calculating module 41 is larger than a given angle, the force monitoring module 49 of FIG. 7 detects the collision by using the first monitoring criterion based on the external force detected by the external force detecting module 48. In detail, the force monitoring module 49 determines whether the external force value $|f_d|$ inputted from the external force detecting module 48 exceeds the first preset threshold $f_{th1}$, and when exceeding the first threshold $f_{th1}$, it determines that the robot 1 collided, generates the collision detection signal, and outputs it to the stop signal generating module 46. In this embodiment, the first threshold $f_{th1}$ is set as 100N. The external force value $|f_d|$ to be compared with the first threshold $f_{th1}$ is a scalar value of the external force $f_d$.

On the other hand, if the joint angle θ calculated by the angle calculating module 41 is the given angle or below, the force monitoring module 49 detects the collision by using a second monitoring criterion which is a monitoring criterion different from the first monitoring criterion based on the external force detected by the external force detecting module 48. In detail, the force monitoring module 49 calculates the value $f'_d$ proportional to the derivative of the external force value $f_d$ inputted from the external force detecting module 48 as the impact which acts on the robot 1. The force monitoring module 49 then determines whether the value $|f'_d|$ of the impact which acts on the robot 1 exceeds a second preset threshold $f_{th2}$, and if exceeding the second threshold $f_{th2}$, it determines that the robot 1 collided, generates the collision detection signal, and outputs it to the stop signal generating module 46. The impact value $|f'_d|$ to be compared with the second threshold $f_{th2}$ is a scalar value of the external force $f'_d$.

Figure 9:
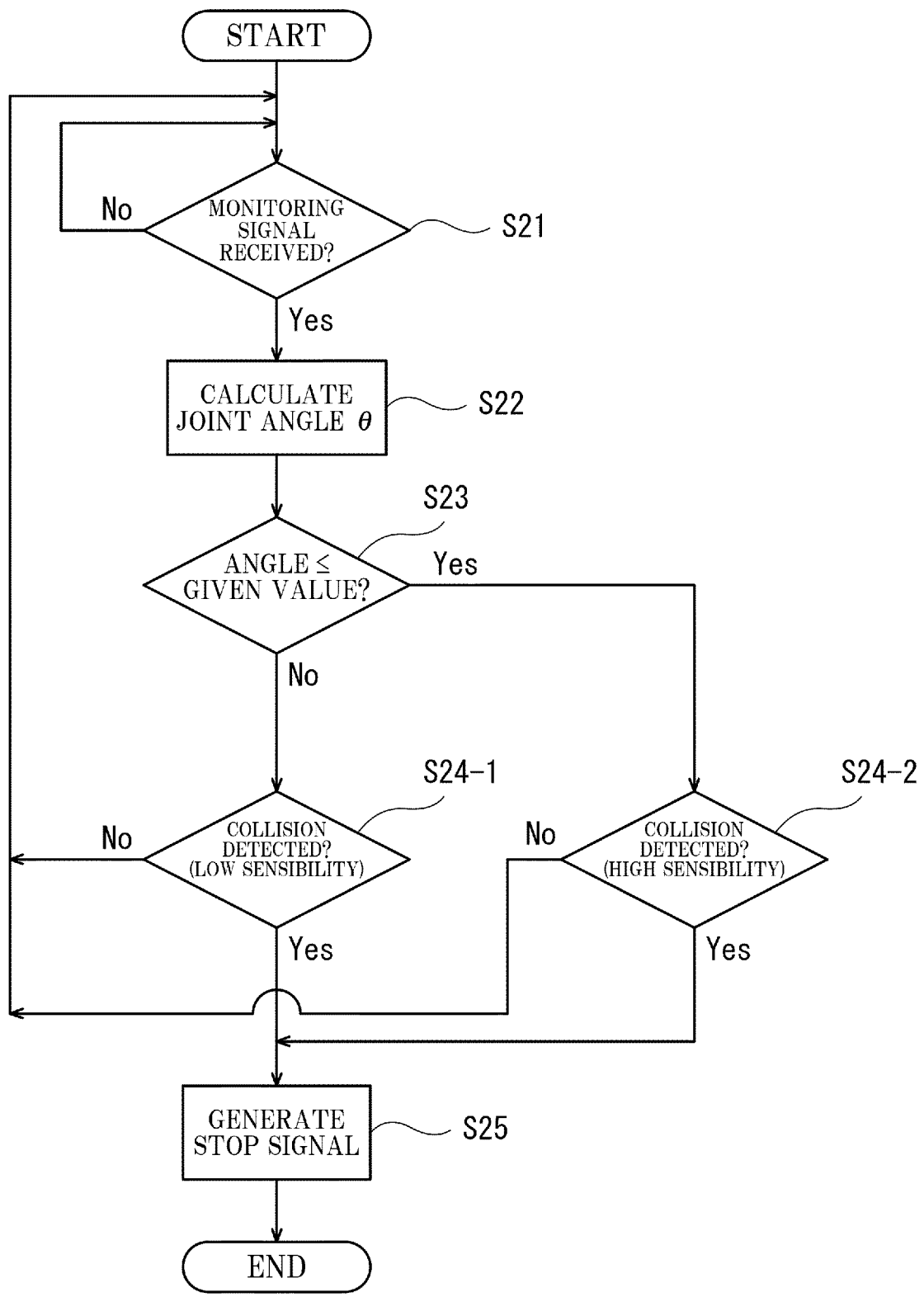
FIG. 9 is a flowchart illustrating a modification of the monitoring operation in FIG. 7.

FIG. 9 is a flowchart illustrating the monitoring operation of this modification. As illustrated in FIG. 9, if the joint angle θ exceeds 20° (NO at Step S23 in FIG. 9), the force monitoring module 49 detects the collision by using the first monitoring criterion based on the external force detected by the external force detecting module 48 (Step S24-1 in FIG. 9). In detail, the force monitoring module 49 determines whether the external force value $|f_d|$ inputted from the external force detecting module 48 exceeds the first threshold $f_{th1}$, and if exceeding the first threshold $f_{th1}$, it determines that the robot 1 collided, generates the collision detection signal, and outputs it to the stop signal generating module 46. Thus, the force monitoring module 49 sets the collision sensibility lower and detects the collision, when the angle monitoring module 42 determines that the obstacle (e.g., the operator) which exists around the robot 1 will not be caught between the first link 20a and the second link 20b.

On the other hand, if the joint angle θ is the given angle or below (YES at Step S23 in FIG. 9), the force monitoring module 49 detects the collision by using the second monitoring criterion which is the different monitoring criterion from the first monitoring criterion based on the external force detected by the external force detecting module 48 (Step S24-2 in FIG. 9). In detail, the force monitoring module 49 calculates the value $f'_d$ proportional to the derivative of the external force value $f_d$ inputted from the external force detecting module 48 as the impact which acts on the robot 1. The force monitoring module 49 then determines whether the value $|f'_d|$ of the impact which acts on the robot 1 exceeds the second preset threshold $f_{th2}$, and if exceeding the second threshold $f_{th2}$, it determines that the robot 1 collided, generates the collision detection signal, and outputs it to the stop signal generating module 46. Thus, the force monitoring module 49 sets the collision sensibility higher and detects the collision, when the angle monitoring module 42 determines that the obstacle (e.g., the operator) which exists around the robot 1 may be caught between by the first link 20a and the second link 20b.

Then, when the collision detection signal is inputted from the force monitoring module 49, the stop signal generating module 46 generates the stop signal of the robot 1 (Step S25 in FIG. 9), and outputs it to the control device 3. Therefore, the control device 3 can stop the operation of the robot 1.

According to this modification, at the angle with no possibility of catching the peripheral object, the collision is detected by using the first monitoring criterion (e.g., setting the collision sensibility lower). On the other hand, at or below the angle with the possibility of catching the peripheral object, the collision is detected by using the second monitoring criterion (e.g., setting the collision sensibility higher). That is, since the collision sensibility can be changed according to the joint angle, both the robot's workability and the operator's safety can be achieved.

Note that although in this embodiment the operation of the robot is stopped after the collision is detected, the collision may be informed to peripheral operators or administrators.

Moreover, although the monitoring device 4A of this embodiment is provided with the force monitoring function for performing the collision detection based on the external force which acts on the robot 1 according to the joint angle, as well as the joint angle monitoring function for monitoring the joint angle, the speed monitoring function according to the joint angle of the first embodiment may be combined with the force monitoring function.

Note that, in this embodiment, since the external force which acts on the robot 1 is calculated based on the current value of the servomotor without using the force sensor, the collision can be highly-accurately detected at low cost. Therefore, the convenience in the joint work of the robot and the operators who works therearound further improves.

Other Embodiments

Note that, although in the above embodiments the angle formed by the first link 20a and the second link 20b which are adjacent to each other through the rotation axis A2 of the joint J2 is monitored (see FIG. 2), it is not limited to this configuration. In the coaxial dual-arm robot 1, an angle formed by the two first links 20a which are adjacent to each other through the rotation axis A1 common to the two joints J1 may be monitored.

Note that, although in the above embodiments the robot 1 is the dual-arm horizontal articulated robot, the present disclosure is not limited to this configuration. It may be a single-arm robot, or may be a vertical articulated robot. Moreover, each robotic arm is not limited to this configuration, as long as it has two links which are adjacent to each other through the at least one joint.

Note that although in the above embodiments the joint angle θ is defined as an angle formed by two links which are adjacent to each other through a joint, one of the two links may be replaced by the end effector at the tip end of the robotic arm 2, or the base of the robot 1. That is, the joint angle θ may be defined as an angle formed by the link and the end effector at the tip end of the robotic arm 2, or the link and the base of the robot, which are adjacent to each other through a joint.

Note that although in the above embodiments the monitoring devices 4 and 4A are provided separately from the control device 3, they may be included in the control device 3. For example, the functional block of each part of the monitoring device 4 may be performed by the processor 6 of the control device 3.

It is apparent for the person skilled in the art that many improvements and other embodiments of the present disclosure are clear from the above description. Therefore, the above description is to be interpreted only as illustration, and it is provided in order to teach the person skilled in the art the best mode that implements the present disclosure. The details of one or both of the configuration and the function may be changed substantially without departing from the spirit of the present disclosure.

INDUSTRIAL APPLICABILITY

The present disclosure is useful for the control device for the robot which coexists and works with people.

DESCRIPTION OF REFERENCE CHARACTERS

1 Robot
2 Robotic Arm
3 Control Device
4, 4A Monitoring Device
5 Current Sensor
6 Processor
7 Servo Amplifier
8 Carriage
9 Base
17 Wrist Part
18 Mechanical Interface
19 End Effector
20 Arm Part
20a First Link
20b Second Link
41 Angle Detecting Module
42 Angle Monitoring Module
43 Speed Limit Value Generating Module
44 Speed Calculating Module
45 Speed Monitoring Module
46 Stop Signal Generating Module
47 Driving Torque Estimating Module
48 External Force Detecting Module
49 Force Monitoring Module
61 Current Command Value Generating Module
62 Speed Limit Value Setting Module
100 Workbench
J Joint
M Servomotor
E Encoder (Position Sensor)
C Cable
θ Joint Angle

What is claimed is:

1. A control device for a robot configured to control operation of a robotic arm having a plurality of links coupled to each other through a rotation axis, and a motor for drive provided to the rotation axis, the control device comprising:
an angle calculating module configured to calculate an angle formed by the two links adjacent to each other through the rotation axis;
an angle monitoring module configured to monitor whether the angle calculated by the angle calculating module is a given angle or below;
an external force detecting module configured to detect an external force acting on the robot; and
a force monitoring module configured to detect a collision by using a given monitoring criterion based on the external force detected by the external force detecting module, when the angle calculated by the angle calculating module is the given angle or below,
wherein the control device is configured to:
control the operation of the robotic arm so that a motor speed does not exceed a given speed when the angle calculated by the angle calculating module is the given angle or below; and stop the operation of the robotic arm when both the collision is detected by the force monitoring module and the angle calculated by the angle calculating module is the given angle or below.

2. The control device of claim 1, wherein the robotic arm is a horizontal articulated robotic arm, wherein the angle calculating module calculates an angle on a horizontal plane, the angle being formed by the two links adjacent to each other through the rotation axis, and wherein the angle monitoring module monitors whether the angle on the horizontal plane, the angle being calculated by the angle calculating module, is the given angle or below.

3. The control device of claim 1, wherein the robotic arm includes a first robotic arm and a second robotic arm, wherein the angle calculating module calculates, for each of the first robotic arm and the second robotic arm, the angle formed by the two links adjacent to each other through the rotation axis, and wherein the angle monitoring module monitors, for each of the first robotic arm and the second robotic arm, whether the angle calculated by the angle calculating module, is the given angle or below.

4. A control device for a robot configured to control operation of a robotic arm having a plurality of links coupled to each other through a rotation axis, and a motor for drive provided to the rotation axis, the control device comprising:

an angle calculating module configured to calculate an angle formed by the two links adjacent to each other through the rotation axis;

an angle monitoring module configured to monitor whether the angle calculated by the angle calculating module is a given angle or below;

an external force detecting module configured to detect an external force acting on the robot; and a force monitoring module configured to detect a collision by using a first monitoring criterion based on the external force detected by the external force detecting module, when the angle calculated by the angle calculating module is larger than the given angle, and detect a collision by using a second monitoring criterion that is a monitoring criterion different from the first monitoring criterion based on the external force detected by the external force detecting module, when the angle calculated by the angle calculating module is the given angle or below, wherein the control device is configured to:

control the operation of the robotic arm so that a motor speed does not exceed a given speed when the angle calculated by the angle calculating module is the given angle or below; and stop the operation of the robotic arm when both the collision is detected by the force monitoring module and the angle calculated by the angle calculating module is the given angle or below.

5. The control device of claim 4, wherein the robotic arm is a horizontal articulated robotic arm, wherein the angle calculating module calculates an angle on a horizontal plane, the angle being formed by the two links adjacent to each other through the rotation axis, and wherein the angle monitoring module monitors whether the angle on the horizontal plane, the angle being calculated by the angle calculating module, is the given angle or below.

6. The control device of claim 4, wherein the robotic arm includes a first robotic arm and a second robotic arm, wherein the angle calculating module calculates, for each of the first robotic arm and the second robotic arm, the angle formed by the two links adjacent to each other through the rotation axis, and wherein the angle monitoring module monitors, for each of the first robotic arm and the second robotic arm, whether the angle calculated by the angle calculating module, is the given angle or below.

* * * * *